United States Patent
Young

(10) Patent No.: US 9,057,412 B2
(45) Date of Patent: Jun. 16, 2015

(54) DRUM AND CONSTRICTING DRUM ASSEMBLY

(71) Applicant: Eaton Corporation, Cleveland, OH (US)

(72) Inventor: Dennis Robert Young, Sheffield Village, OH (US)

(73) Assignee: Eaton Corporation, Cleveland, OH (US)

( * ) Notice: Subject to any disclaimer, the term of this patent is extended or adjusted under 35 U.S.C. 154(b) by 15 days.

(21) Appl. No.: 13/826,700

(22) Filed: Mar. 14, 2013

(65) Prior Publication Data

US 2014/0262639 A1 Sep. 18, 2014

(51) Int. Cl.
| F16D 65/10 | (2006.01) |
| F16D 51/08 | (2006.01) |
| F16D 49/12 | (2006.01) |
| F16D 121/02 | (2012.01) |
| F16D 125/14 | (2012.01) |

(52) U.S. Cl.
CPC ................ F16D 65/10 (2013.01); F16D 51/08 (2013.01); F16D 49/12 (2013.01); F16D 2121/02 (2013.01); F16D 2125/14 (2013.01)

(58) Field of Classification Search
CPC ......... F16D 65/10; F16D 65/12; F16D 49/08; F16D 49/10; F16D 49/12; F16D 49/14; F16D 49/16; F16D 49/18; F16D 2250/0061; F16D 2250/0069; F16D 2250/0076; F16D 2250/008; F16D 2250/0084

USPC ........ 188/218 R, 264 R, 29, 57, 74, 75, 77 R, 188/77 W, 366, 367, 368, 369

See application file for complete search history.

(56) References Cited

U.S. PATENT DOCUMENTS

| 1,702,391 | A | * | 2/1929 | Price | 188/218 R |
| 1,704,033 | A | * | 3/1929 | Cautley | 188/218 R |
| 1,900,844 | A | * | 3/1933 | Norton | 188/218 R |
| 2,008,173 | A | * | 7/1935 | Dake et al. | 188/218 R |
| 2,182,238 | A | * | 12/1939 | Rasmussen | 29/456 |
| 2,392,225 | A | * | 1/1946 | Butler | 188/367 |
| 2,563,769 | A | * | 8/1951 | Wyant | 188/264 R |
| 2,702,613 | A | * | 2/1955 | Walther, Sr | 188/218 R |
| 2,834,417 | A | * | 5/1958 | Bachle | 305/9 |
| 3,055,458 | A | * | 9/1962 | Sanford et al. | 188/264 D |
| 3,583,533 | A | * | 6/1971 | Jones et al. | 188/218 R |
| 5,230,414 | A | * | 7/1993 | Diesch | 192/85.13 |

FOREIGN PATENT DOCUMENTS

JP 2002066724 A * 3/2002 ............. B22D 19/14

OTHER PUBLICATIONS

English-language abstract of JP 2002-066724 (May 5, 2002).*

* cited by examiner

*Primary Examiner* — Nicholas J Lane
(74) *Attorney, Agent, or Firm* — Daniel S. Kalka

(57) ABSTRACT

A drum for a constricting drum brake assembly with at least one drum insert with a plurality of fins forming a cooling ring for transferring heat from the drum generated during the braking action.

10 Claims, 4 Drawing Sheets

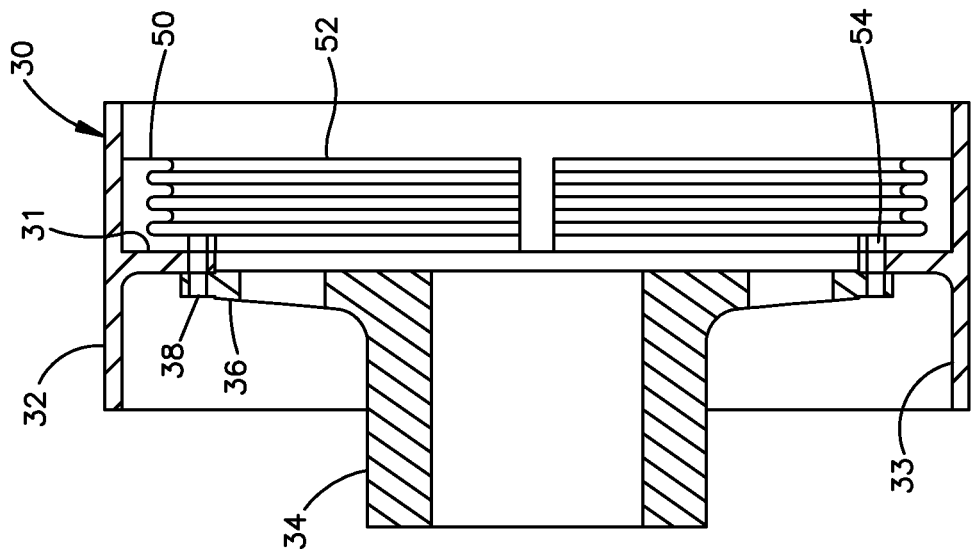
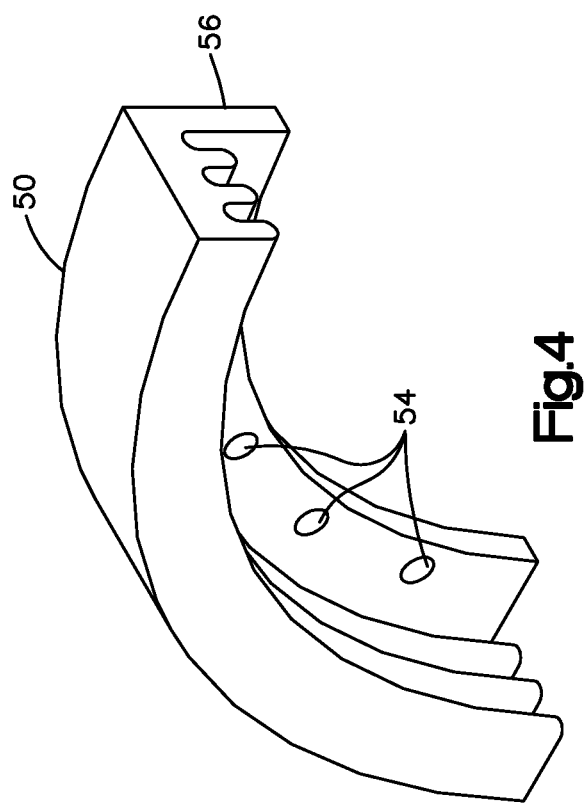

DRUM AND CONSTRICTING DRUM ASSEMBLY

BACKGROUND

The present disclosure relates to an improved drum with a cooling arrangement for a constricting drum assembly for a constricting drum brake or clutch assembly of the particular type having an inflatable tube disposed in a housing about the drum used in a wide variety of industrial and commercial applications requiring braking action.

In a constricting pneumatic drum brake, an inflatable tube in a brake housing is employed and expanded with a fluid at selected times for braking action or in other applications as a clutch. As used herein the term "constricting drum brake assembly" or "pneumatic constricting brake assembly" or the like is intended to encompass a brake assembly that can function either as a brake, a clutch, or both through a braking action. The inflatable tube acts upon friction elements causing them to engage against the outer surface of a drum for the braking action. Heat is generated during the braking action and this heat needs to be dissipated in an efficient manner to prolong the life of the drum and other components of the brake assembly, the input shaft, and the workpiece connected to the input shaft affected by the heat. Thus, there still exists a need for an improved drum and constricting drum brake assembly which dissipates the heat generated during the braking action to reduce the surface temperature of the drum and surrounding areas, and extends the life of the drum and other components.

SUMMARY

The present disclosure describes an improved constricting drum for a constricting drum assembly and constricting drum brake assembly for use as a brake or a clutch that incorporates annular drum inserts with annular fins functioning as cooling rings within the drum.

The improved drum for a constricting drum brake assembly comprises a drum disposed for rotary movement within a coupling component for providing a braking action. The drum has an annular outer surface and an annular inner surface. At least one drum insert is positioned within the drum on the inner surface. The drum insert has a plurality of annular fins extending radially in an inward direction for transferring heat generated from the braking action away from the drum.

The present disclosure also relates to an improved constricting drum assembly having a coupling component with an annular array of friction elements operably disposed therein for radial movement. A drum is disposed for rotary movement with respect to the coupling component. The drum may have an annular hub and an annular outer surface disposed radially outwardly of the optional hub about the outer periphery for the braking action. An inflatable tube is disposed in the coupling component and is operable upon inflation to move the friction elements into contact with the outer surface for the braking action. At least one annular drum insert is disposed inside the drum on an annular inner surface with the at least one annular drum insert having a plurality of annular fins extending radially in the drum inwardly towards the hub for transferring heat generated during the braking action.

BRIEF DESCRIPTION OF THE DRAWINGS

FIG. 4 is an elevated perspective view of an annular drum insert according to the present disclosure; and FIG. 5 is a section view of the improved drum 30 according to the present disclosure.

DETAILED DESCRIPTION

Figure 1:
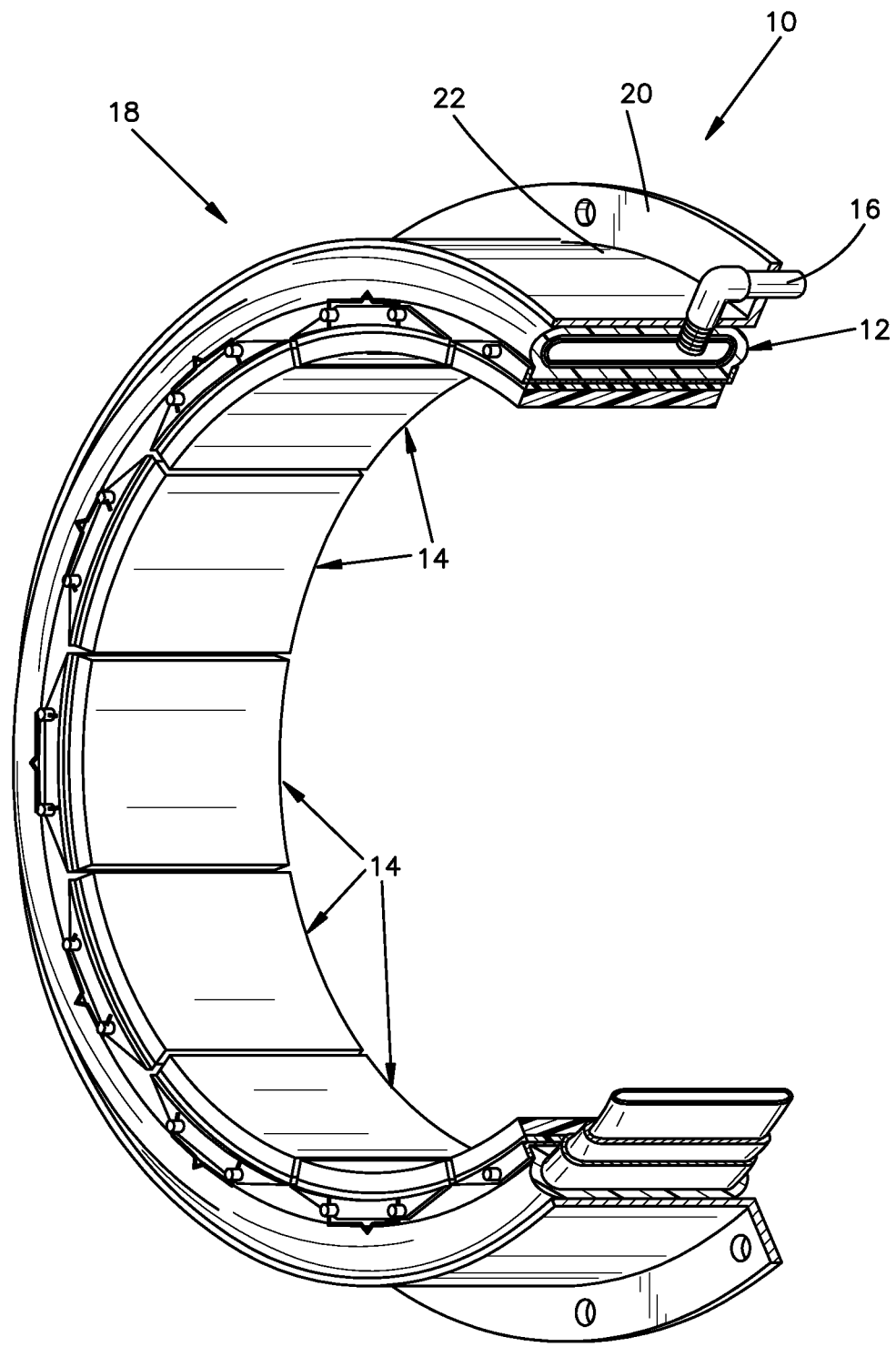
FIG. 1 is a perspective view, in partial cross-section, of a constricting coupling component of a drum brake assembly without the drum being shown.

Referring now to the drawings, which are not intended to limit the subject disclosure and where like numerals designate like or similar features throughout the several views, FIG. 1 depicts a coupling component 10 of a constricting drum brake assembly 8 that may function either as a clutch or as a brake. The coupling component 10 includes an annular inflatable tube 12 and an annular array of friction elements 14. The annular inflatable tube 12 surrounds the annular array of friction elements 14 disposed within coupling component 10. The friction elements 14 are constructed to engage an annular outer surface 32 of a brake drum 30 shown in FIG. 2 which together with the coupling component 10 makes up the constricting drum brake assembly 8. Upon inflation with a fluid, like air for example, through a valve or conduit 16, tube 12 expands causing friction elements 14 to be constricted radially inwardly and causes the radially inner surfaces of the friction elements 14 to frictionally engage an annular outer surface 32 of drum 30. The friction between the friction elements 14 and drum 30 interconnect the drum 30 and coupling component 10 for a braking action which may be used functionally either as a brake or as a clutch.

As seen in FIG. 1, the coupling component 10 includes a rigid annular metal rim 18 connected with the inflatable tube 12. The rim 18 has an annular flange 20 which is used to connect the coupling component 10 with an associated apparatus or support structure (not shown). The rim 18 has a cylindrical web 22 with a radially inner side surface which is positioned within a radially outer side wall portion of the tube 12.

Figure 2:
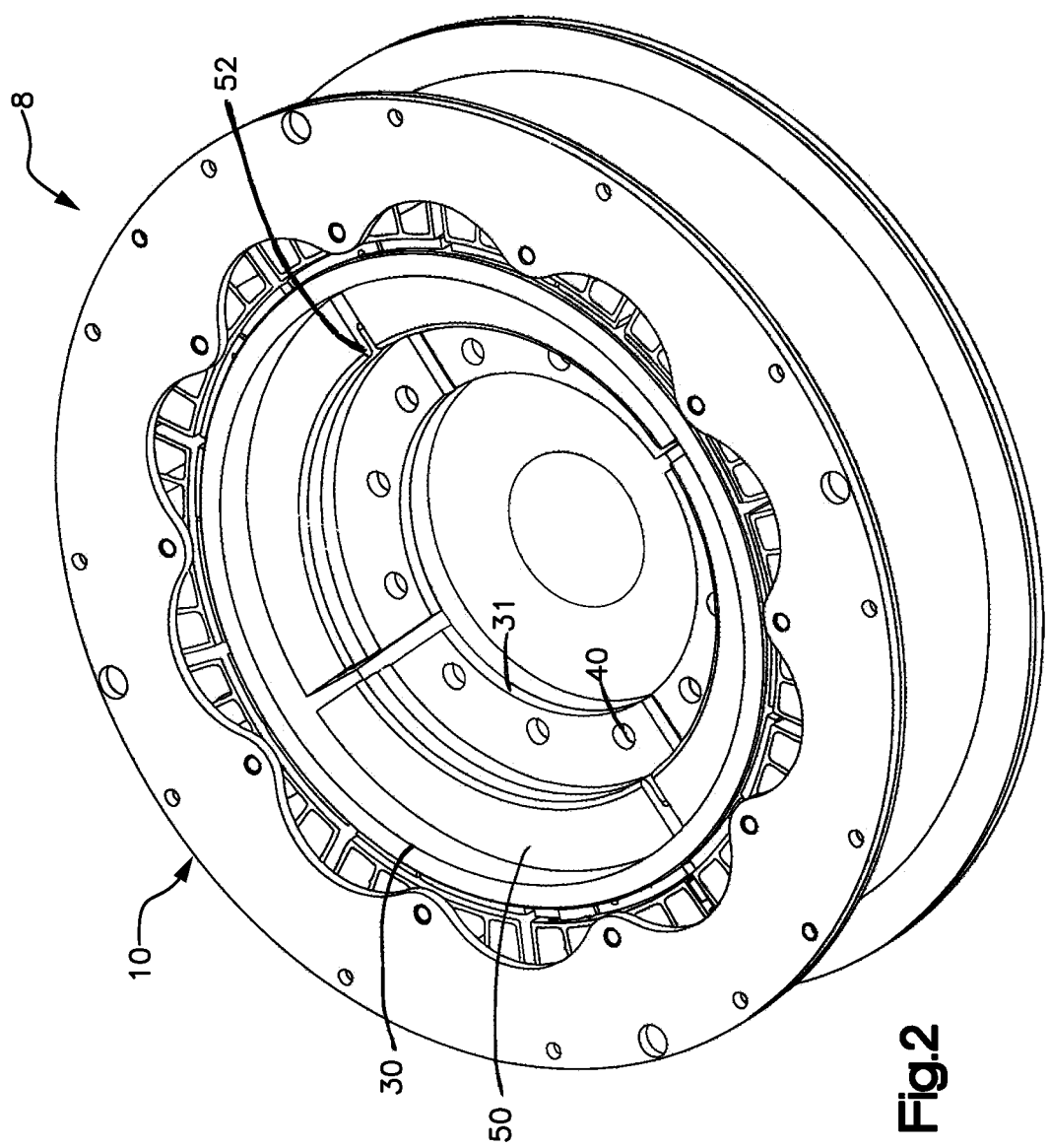
FIG. 2 is a perspective view of one embodiment of a constricting drum brake assembly according to the present disclosure showing the annular drum insert with annular fins.

Upon inflation of the inflatable tube 12 through the air supply connection 16, the inflatable tube 12 causes friction elements 14 to move radially inwardly to constrict against the outer surface 32 of the drum 30 for what is termed herein as the "braking action". This term is meant to include functioning as a clutch through the engagement of the friction elements 14 of the coupling component 10 with the annular outer surface 32 of the drum 30. FIG. 2 shows the improved drum 30 according to one embodiment of the present disclosure positioned within the coupling component 10.

Figure 3:
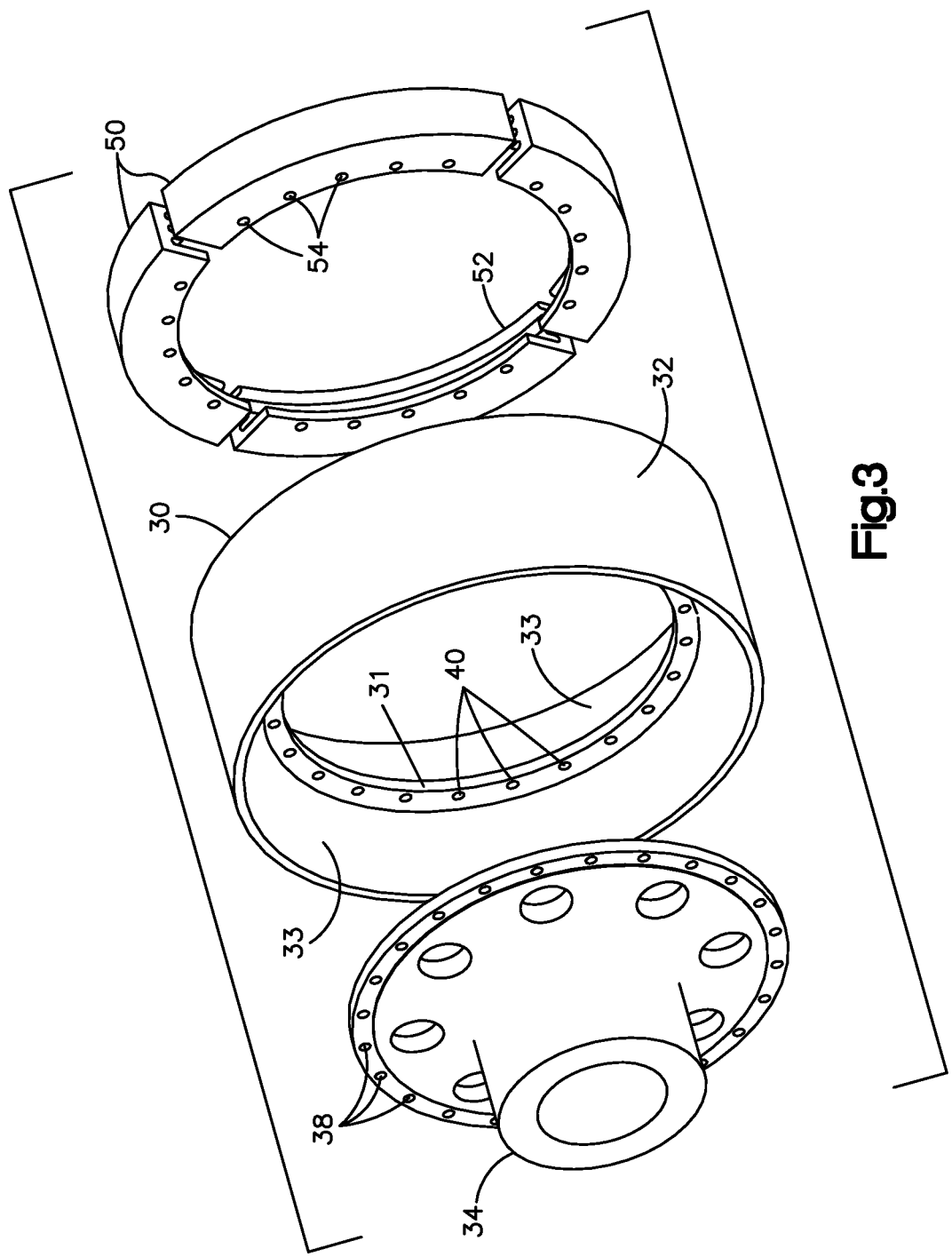
FIG. 3 is an exploded view of one embodiment of the improved drum according to the present disclosure.

Turning next to FIG. 3, there is shown in exploded view another embodiment of the improved drum 30 according to the present disclosure. Annular drum 30 is cylindrical in form with a fairly centrally located annular connecting ring 31. Drum 30 includes the outer annular surface 32 constructed to engage the friction elements 14 of coupling component 10, and an annular inner surface 33 with the annular connecting ring or partition 31 depending upon the style of the drum. The ring or partition 31 can be located on one end of the drum depending upon style. The drum 30 may include an annular drum hub 34 and at least one annular drum insert 50. Annular drum hub 34 has a hollow interior for receiving or connecting to an input shaft (not shown) of a workpiece (not shown). Drum hub 34 includes an extending wall portion 36 with a plurality of mounting holes 38 about its outer periphery for mounting the drum hub 34 within drum 30 with fasteners (not shown), such as bolts, through corresponding holes 40 in the ring 31 of drum 30. Holes 38 may align with some or all of the openings 54 in the annular insert 50 on the opposite side of annular connecting ring 31 as is seen in FIG. 5. Fasteners through holes 40 assemble the drum hub 34 on one side of the annular ring 31 to the annular drum insert(s) 50 on the other side. The drum hub 34 may contain other openings as seen in FIG. 3 for facilitating attachment to the workpiece or for supporting the drum 30 in its connection with the input shaft of the workpiece, or even functioning simply as vents for generated heat. In the other embodiment seen in FIG. 2, drum 30 does not utilize a drum hub 34. In that embodiment, annular ring 31 with holes 40 may be used to connect the drum 30 to an input shaft via a collar (not shown) or the like to the workpiece.

Annular drum insert 50 has a plurality of radially extending annular fins 52 and is disposed within the annular drum 30 on the inner surface 33 thereof opposite the drum hub 34 in an opposing relationship with annular connecting ring 31 separating the two in the embodiment shown in FIG. 3. The annular fins 52 extend radially inwardly towards a center of the drum 30. In the other embodiment, where the optional drum hub 34 is not employed, the annular insert 50 may be mounted on one or both sides of the annular ring 31 inside drum 30 in any manner known in the art, for example fasteners, welding, adhesively, or the like. In another embodiment the annular ring may be omitted, and the drum inserts mounted within drum 50 on the inner surface. In the embodiment depicted in FIG. 3, there are a plurality of annular drum inserts 50 mounted to the annular ring 31 with openings 54 in an annular mounting bracket 56 for fasteners for the insert 50 as best seen in FIG. 4. While a plurality of inserts 50 are shown in FIG. 3, it should be immediately apparent that one annular insert 50 extending around the circumference of the inner diameter of the drum may be used, or alternatively an array of annular inserts 50 selectively positioned at quadrants or one at each half of the inner surface 33 of the drum 30 may be employed. The annular inserts 50 transfer heat generated during the braking action away from the drum 30 and drum assembly 8. The plurality of inserts 50 function as a cooling ring for the drum 30. They may be made of any material that efficiently can transfer heat, for example, a metal matrix composite material with high thermal conductivity, such as an aluminum composite material. The radially extending fins 52 are directed inwardly towards the center of the drum preferably substantially perpendicular to the inner surface 33 of the drum 30. The annular drum inserts 50 may be disposed in an array on the inner surface 33 in alignment with the friction elements 14 of the coupling component 10 for more efficiently transferring heat from the outer surface 32 of the drum 30.

The exemplary embodiments have been described with reference to the present disclosure. Obviously, modifications and alterations will occur to others upon reading and understanding the preceding detailed description. It is intended that the exemplary embodiments be construed as including all such modifications and alterations insofar as they come within the scope of the appended claims or the equivalents thereof.

I claim:

1. An improved drum for a constricting pneumatic drum brake assembly, comprising:
   (a) a drum disposed for rotary movement constructed to be received within a coupling component having an annular array of friction elements, the annular array of friction elements configured to move in a radial direction to engage the drum upon pneumatic inflation of the coupling component to provide a braking action, the drum having an annular outer and an annular inner surface with an annular ring extending radially inwardly from the annular inner surface of the drum, the outer annular surface of the drum constructed to engage the annular array of friction elements on the coupling component; and
   (b) a plurality of drum inserts disposed inside the drum and being situated substantially about the entire circumference of the annular inner surface of the drum, each of the drum inserts having a mounting bracket adapted for attachment to the annular ring, each of the drum inserts having a plurality of curved fins extending radially inwardly towards a center of the drum and substantially perpendicular to the inner surface of the drum for transferring heat generated during the braking action, the plurality of drum inserts being positioned on the inner surface of the drum in an annular array in alignment with the annular array of friction elements on the coupling component.

2. The improved drum as defined in claim 1, wherein the mounting bracket on each of the drum inserts comprises an integrally formed mounting bracket for fastening the drum insert into the drum.

3. The improved drum as defined in claim 1, wherein each of the drum inserts is composed of a metal matrix composite material having thermal conductivity.

4. The improved drum as defined in claim 1, wherein the mounting bracket on each of the drum inserts includes a plurality of openings for receiving fasteners through corresponding holes in the annular ring.

5. An improved constricting pneumatic drum brake assembly, comprising:
   (a) a coupling component having an annular array of friction elements;
   (b) a drum disposed for rotary movement with respect to the coupling component, the drum having an annular outer and an annular inner surface with an annular ring extending radially inwardly from the annular inner surface of the drum, the annular outer surface of the drum constructed to engage the plurality of friction elements of the coupling component;
   (c) an inflatable tube disposed within the coupling component operable upon inflation to move the friction elements in a radial direction into contact with the annular outer surface of the drum; and
   (d) a plurality of drum inserts disposed inside the drum on the annular inner surface of the drum, each of the drum inserts having a plurality of curved fins extending radially inwardly towards a center of the drum and substantially perpendicular to the inner surface of the drum for transferring heat generated during the braking action, the plurality of drum inserts being disposed in an annular array substantially about the entire circumference of the annular inner surface of the drum.

6. The drum brake assembly as defined in claim 5, wherein each of the drum inserts further comprises an integrally formed mounting bracket for fastening the drum insert into the drum.

7. The drum brake assembly as defined in claim 5, wherein the annular array of drum inserts is positioned on the inner surface of the drum in alignment with the annular array of friction elements of the coupling component.

8. The drum brake assembly as defined in claim 5, wherein each of the drum inserts is composed of a metal matrix composite material having thermal conductivity.

9. An improved drum as defined in claim 4, wherein metal matrix composite material comprises an aluminum composite material.

10. An improved drum as defined in claim 1, wherein the annular inner ring on the inner surface of the drum includes a plurality of holes about its periphery for retaining the plurality of drum inserts.

\* \* \* \* \*